United States Patent
Chhabra et al.

(10) Patent No.: US 9,098,434 B2
(45) Date of Patent: Aug. 4, 2015

(54) LOAD BALANCING SYSTEMS AND METHODS OF MAC LEARNING IN MULTI-SLOT ARCHITECTURES

(71) Applicants: Mukesh Chhabra, New Delhi (IN); Prashant Vashisht, Gurgaon (IN); Mohit Batra, Delhi (IN); Rajneesh Mishra, Ghaziabad (IN)

(72) Inventors: Mukesh Chhabra, New Delhi (IN); Prashant Vashisht, Gurgaon (IN); Mohit Batra, Delhi (IN); Rajneesh Mishra, Ghaziabad (IN)

(73) Assignee: Ciena Corporation, Hanover, MD (US)

( * ) Notice: Subject to any disclaimer, the term of this patent is extended or adjusted under 35 U.S.C. 154(b) by 224 days.

(21) Appl. No.: 13/659,554

(22) Filed: Oct. 24, 2012

(65) Prior Publication Data

US 2014/0071825 A1    Mar. 13, 2014

(30) Foreign Application Priority Data

Sep. 11, 2012 (IN) ............ 2838/DEL/2012

(51) Int. Cl.
   *H04L 12/58* (2006.01)
   *G06F 13/12* (2006.01)
   *H04L 12/803* (2013.01)
   *H04L 12/931* (2013.01)

(52) U.S. Cl.
   CPC ............ *G06F 13/124* (2013.01); *H04L 47/125* (2013.01); *H04L 49/00* (2013.01)

(58) Field of Classification Search
   USPC .................. 370/236, 392, 428, 429
   See application file for complete search history.

(56) References Cited

U.S. PATENT DOCUMENTS

| | | |
|---|---|---|
| 6,556,541 B1 | 4/2003 | Bare |
| 7,305,458 B2 | 12/2007 | Hsue et al. |
| 7,626,930 B2 | 12/2009 | Agmon et al. |
| 7,760,619 B2 | 7/2010 | Abdulla et al. |
| 8,130,644 B2 | 3/2012 | Tanaka et al. |
| 2007/0268915 A1* | 11/2007 | Zelig et al. ............ 370/401 |
| 2008/0089247 A1 | 4/2008 | Sane et al. |
| 2008/0107043 A1* | 5/2008 | Smith et al. ............ 370/255 |
| 2010/0150161 A1 | 6/2010 | Saksena et al. |
| 2011/0273987 A1 | 11/2011 | Schlansker et al. |
| 2012/0033541 A1 | 2/2012 | Da Silva et al. |
| 2012/0033665 A1 | 2/2012 | Da Silva et al. |
| 2012/0033669 A1 | 2/2012 | Mohandas et al. |
| 2012/0033678 A1 | 2/2012 | Page et al. |
| 2012/0163164 A1 | 6/2012 | Terry et al. |

* cited by examiner

*Primary Examiner* — Ricky Ngo
*Assistant Examiner* — Wei-Po Kao
(74) *Attorney, Agent, or Firm* — Clements Bernard PLLC; Christopher L. Bernard; Lawrence A. Baratta, Jr.

(57) ABSTRACT

Line cards in a multi-slot network element utilize load balancing systems and methods for synchronizing learned Media Access Control (MAC) addresses therebetween. It is an objective of the load balancing systems and methods to enable high data rate scalability between line cards in a distributed system while preventing adverse effects on packet traffic. The load balancing systems and methods include inter alia MAC address updates between data path devices (e.g., network processors, application specific integrated circuits, etc.) using data frames and a hash-based time slot strategy ensuring MAC address updates are distributed over time as opposed to large scale, singular events.

20 Claims, 5 Drawing Sheets

LOAD BALANCING SYSTEMS AND METHODS OF MAC LEARNING IN MULTI-SLOT ARCHITECTURES

CROSS-REFERENCE TO RELATED APPLICATION(S)

The present non-provisional patent claims the benefit of priority of co-pending Indian Patent Application No. 2838/DEL/2012, filed on Sep. 11, 2012, and entitled "LOAD BALANCING SYSTEMS AND METHODS OF MAC LEARNING IN MULTI-SLOT ARCHITECTURES," the contents of which are incorporated in full by reference herein.

FIELD OF THE INVENTION

Generally, the field of art of the present disclosure pertains to Ethernet systems and methods, and more particularly, to load balancing systems and methods of Media Access Control (MAC) address learning across multi-slots in a network element.

BACKGROUND OF THE INVENTION

MAC address learning is a service provided by a switch in which MAC address and incoming interface information of each packet is learned locally in a database on the switch. This service can be characterized as a learning bridge, in which a source MAC address of each received packet is stored in a forwarding database so that future packets destined for that address can be forwarded only to the bridge interface on which that address is located. Packets destined for unrecognized addresses are forwarded out every bridge interface. MAC address learning helps minimize traffic on the attached Local Area Networks (LANs). As Ethernet switch sizes evolve, maintenance of the forwarding database becomes significant. For example, Ethernet switches are evolving from single devices to large scale chassis with multiple line cards, blades, modules, "pizza boxes", etc. As described herein, line cards, blades, modules, "pizza boxes", etc. all refer to modules in an Ethernet switch, and are collectively referred to herein as line cards. In the single device case, management of the forwarding database is straightforward in that all processing and storage circuitry related to the forwarding database is on the single device and in communication therein. As the large scale chassis develop, individual line cards have their own forwarding databases thereon that are managed, but need to be synchronized with other line cards in the same Ethernet switch.

Conventionally, the multiple line card solution can include a central repository of the forwarding databases for all associated modules that is updated as and when required. However, this solution can cause the scalability issues especially in the case when the MAC address entries need to be synchronized on a periodic basis in case of topologies such as bridging over link aggregation. Multi chassis architectures therefore employ a solution where line cards periodically update the MAC address in the peer line cards by a messaging mechanism. The messaging mechanism may either be implemented in software through some interprocess communications (IPC) mechanism or may be implemented in hardware (e.g., application specific integrated circuit (ASIC), network processor unit (NPU), field programmable gate array (FPGA), etc.). The hardware based periodic synchronization can utilize a lot of hardware bandwidth at timely intervals. As a result of which hardware switching capacity may exceed its total supported capacity and can result in periodic packet drops due to the synchronization. Among other things, this presents a challenge in meeting service layer agreements with end users.

BRIEF SUMMARY OF THE INVENTION

In an exemplary embodiment, an Ethernet system includes a first line card including at least one port receiving Ethernet data packets and a first data path device; and a second line card including at least one port receiving Ethernet data packets and a second data path device, wherein the second line card is communicatively coupled to the first line card; wherein the first data path device is configured to synchronize learned Media Access Control (MAC) addresses with the second data path device by exchanging of data packets therebetween according to a hash-based time slot approach. The first data path device can be configured to learn MAC addresses received from a port side and from a fabric side associated with the first line card. The hash-based time slot approach can be configured to distribute the data packets of learned MAC addresses over time to prevent adverse effects on packet traffic. The hash-based time slot approach can be configured to slot newly learned MAC addresses into time slots for an associated data packet to be sent to the second data path device. The hash-based time slot approach can utilize a plurality of parameters to assign a newly learned MAC address to a time slot for synchronization. The plurality of parameters can include any of hardware logical port identification, virtual local area network identification, destination MAC address, and source MAC address. The hash-based time slot can include a plurality of XOR operations on the plurality of parameters to derive a time slot. The first data path device, upon learning a new MAC address associated with a link aggregation group, can be configured to in-band message the second data path device the new MAC address. The Ethernet system can further include a first general processor on the first line card; and a second general processor on the second line card; wherein the first general processor and the second general processor do not participate in the learning MAC addresses. The first general processor can be configured to fetch MAC addresses from the first data path device responsive to a user request.

In another exemplary embodiment, a data path device includes logic circuitry configured to learn Media Access Control (MAC) addresses both from a port side and a fabric side; and logic circuitry configured to synchronize learned MAC addresses with at least one additional data path device disposed on a separate line card; wherein the synchronized learned MAC addresses are sent to the at least one additional data path device via data packets according to a hash-based time slot approach. The hash-based time slot approach can be configured to distribute the data packets of learned MAC addresses over time to prevent adverse effects on packet traffic. The hash-based time slot approach can be configured to slot newly learned MAC addresses into time slots for an associated data packet to be sent to the at least one additional data path device. The hash-based time slot approach can utilize a plurality of parameters to assign a newly learned MAC address to a time slot for synchronization. The plurality of parameters can include any of hardware logical port identification, virtual local area network identification, destination MAC address, and source MAC address. The hash-based time slot can include a plurality of XOR operations on the plurality of parameters to derive a time slot. The logic circuitry configured to synchronize learned MAC addresses, upon learning a new MAC address associated with a link aggregation group, can be configured to in-band message the at least one additional data path device the new MAC address.

In yet another exemplary embodiment, a method includes utilizing a first data path device on a first line card to learn Media Access Control (MAC) addresses; synchronizing newly learned MAC addresses with at least one additional data path device on a separate line card from the first line card, wherein the synchronizing includes exchanging a data packet according to hash-based time slot approach; and operating a generalized processor on the first line card without the generalized processor being involved in the synchronizing newly learned MAC addresses. The method can further include performing a plurality of XOR operations on a plurality of parameters associated with a packet having a newly learned MAC address to determine a time slot for the data packet. The method can further include determining a newly learned MAC address is involved in a link aggregation group (LAG) associated with the separate line card; and in-band messaging the at least one additional data path device with the newly learned MAC address.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, the present disclosure provides load balancing systems and methods of MAC address learning across multi-slots in a network element. The load balancing systems and methods provide a hardware synchronization mechanism addressing the aforementioned challenges that evolve with hardware based synchronization. It is an objective of the load balancing systems and methods to enable high data rate scalability between line cards in a distributed system while preventing adverse effects on packet traffic. The load balancing systems and methods include inter alia MAC address updates between network processors using data frames and a hash-based time slot strategy ensuring MAC address updates are distributed over time as opposed to large scale, singular events. Note, in addition to network processors, the load balancing systems and methods can operate with an Ethernet-based circuitry such as Ethernet-based application specific integrated circuits (ASICs), etc. The network processors, Ethernet-based ASICs, etc. can generally be referred to as data path devices.

Figure 1:
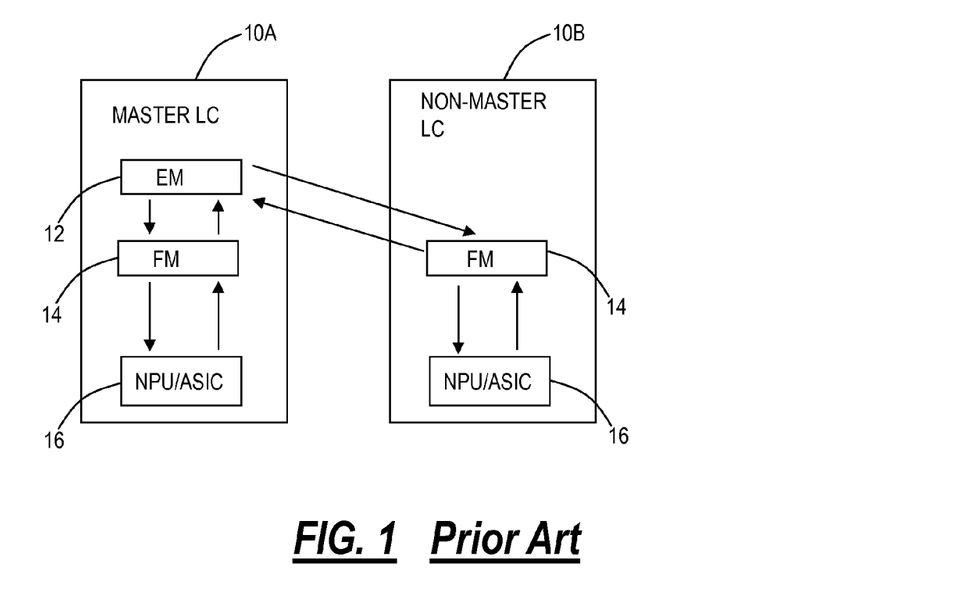
FIG. 1 is a block diagram of two line cards (LCs) performing conventional MAC address synchronization.
Figure 2:
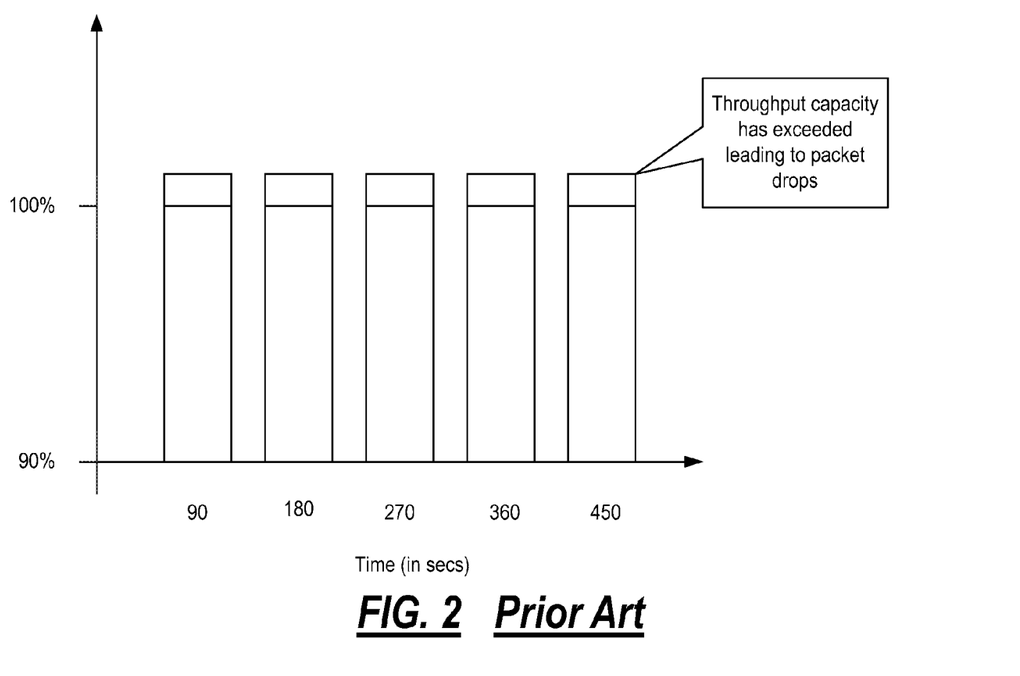
FIG. 2 is a graph of throughput capacity associated with the line cards of FIG. 1.

Referring to FIGS. 1-2, in conventional embodiments, a block diagram (FIG. 1) illustrates line cards (LC) 10A, 10B for conventional MAC address synchronization therebetween and a graph (FIG. 2) of throughput capacity of the line cards 10A, 10B. The line cards 10A, 10B are each Ethernet switching modules with one or more ports coupled thereto (not shown). The line card 10A includes an Ethernet manager 12, a forwarding module 14, and a network processor (NPU)/ASIC 16. The line card 10B includes a forwarding module 14 and a network processor (NPU)/ASIC 16. Note, the line card 10A is designated as a master and the line card 10B is designated as the non-master. With respect to the master and non-master line cards 10A, 10B, the master manages the forwarding database (FDB) entries in software and provides associated user interfaces (e.g., CLI, HTTP, SNMP etc.). Each of the Ethernet manager 12, the forwarding module 14, and the NP/ASIC 16 includes integrated circuitry and associated software/firmware for operations thereof. The Ethernet manager 12 can be implemented on a general processor (CPU) or the like, and generally provides control functionality in the line card 10A. The forwarding module 14 is configured to provide switching functionality. The NP/ASIC 16 is an integrated circuit which has a feature set specifically targeted to packet switching, i.e. the NP/ASIC is a data path device. The line cards 10A, 10B can also include a forwarding database which is implemented in circuitry and provides storage of all learnt MAC addresses. This forwarding database can be a stand-alone component or integrated within any of the Ethernet manager 12, the forwarding module 14, and/or the NP/ASIC 16. Those of ordinary skill in the art will recognize that the line cards 10A, 10B can include other components, devices, functions, etc. which are omitted for illustration purposes.

In conventional operation, MAC addresses are learned in the line card 10A utilizing learning functionality associated with the NP/ASIC 16. Whenever a new MAC address is learned, an interrupt is raised by the NP/ASIC 16 that notifies the forwarding module 14 in the line card 10A. Learnt MAC addresses are then propagated to the Ethernet manager 12 from the forwarding module 14 in the line card 10A. The Ethernet manager 12 will send the learnt MAC addresses to other line cards, such as the line card 10B, at periodic intervals ensuring that all line cards 10A, 10B have the same set of MAC addresses in their associated forwarding database.

FIG. 2 illustrates a graph of throughput capacity of the hardware on the line cards 10A, 10B over time. Note, in the exemplary embodiment of FIG. 2, the periodic update interval between the line cards 10A, 10B for learnt MAC addresses is 90 secs. It is shown that every 90 secs, the line cards 10A, 10B can experience a spike in throughput capacity that is in excess of overall capacity leading to packet loss due to the MAC address synchronization between the line cards 10A, 10B. Also, note the line card 10A requires hardware involvement of both the NP/ASIC 16 and the Ethernet manager 12 in conventional MAC address synchronization.

Figure 3:
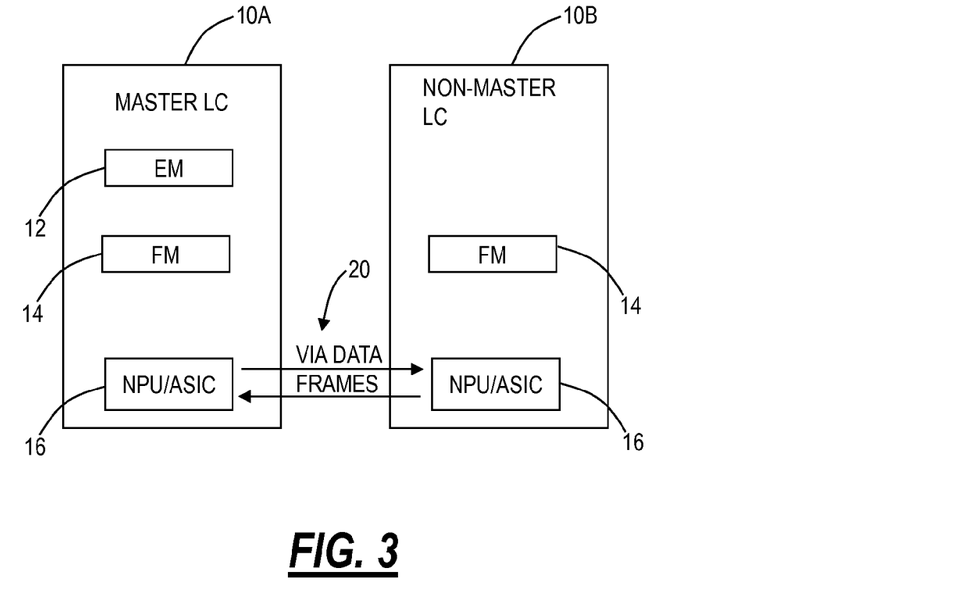
FIG. 3 is a block diagram of two line cards (LCs) performing MAC address synchronization in accordance with load balancing systems and methods described herein.
Figure 4:
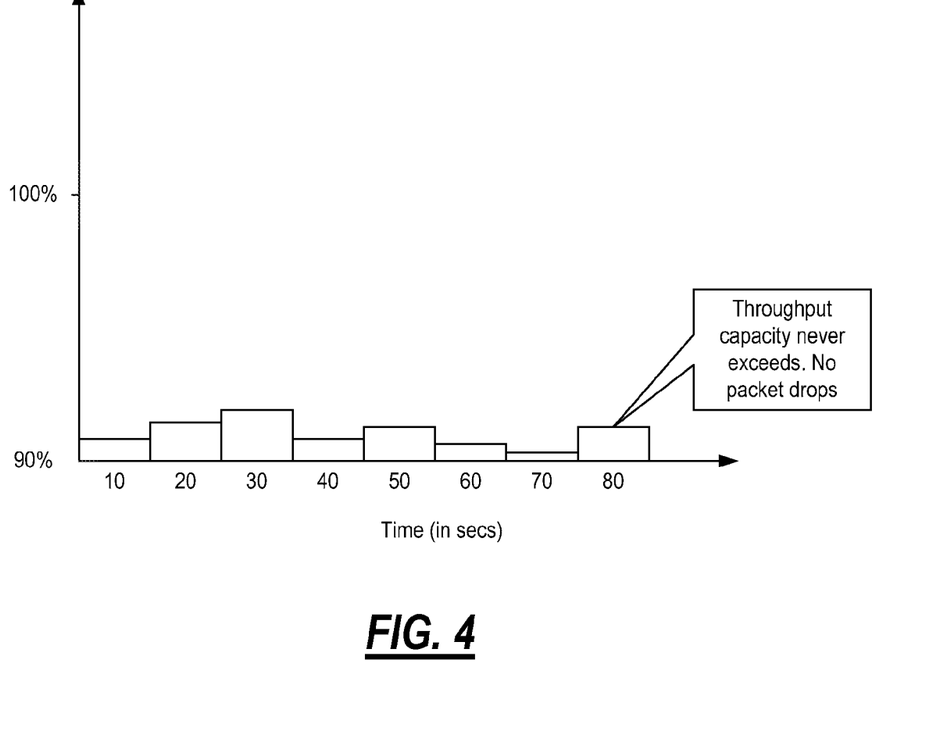
FIG. 4 is a graph of throughput capacity associated with the line cards of FIG. 3.

Referring to FIGS. 3-4, in exemplary embodiments, a block diagram (FIG. 3) illustrates line cards (LC) 10A, 10B for MAC address synchronization therebetween in accordance with the systems and methods described herein and a graph (FIG. 3) of throughput capacity of the line cards 10A, 10B. The load balancing systems and methods described herein propose elimination of processor (i.e. the Ethernet manager 12) involvement in the learning of dynamic MAC entries. Instead, the NP/ASICs 16 are configured to communicate therebetween across the line cards 10A, 10B (and any additional line cards in systems with more than two line cards) for MAC address synchronization. Note, the Ethernet manager 12 is still involved in overall system operation in the line cards 10A, 10B including MAC entry user requests such as display and deletion of entries and the like. Removing the MAC address synchronization from the Ethernet manager 12 relieves the Ethernet manager 12 for other critical applications such as xSTP (i.e., various Spanning Tree Protocol algorithms), LAG (Link Aggregation Group), IGMP (Internet Group Management Protocol), etc.

The load balancing systems and methods described herein contemplate "off-the-shelf" NP/ASICs 16 as well as custom designed circuits. In particular, the load balancing systems and methods contemplate software, firmware, etc. to program the NP/ASICs 16 to perform the foregoing functions thereby relieving the Ethernet manager 12 (i.e., a CPU on the line card 10A) from MAC address synchronization and learning. The NP/ASICs 16 are configured to learn unknown unicast MAC entries in both ingress and egress direction. In the load balancing systems and methods, the NP/ASIC 16 on learning a new MAC shall not interrupt the Ethernet manager 12, so that Ethernet manager 12 is not involved in learning of the MAC. All the MAC learning that needs to be done shall only have the involvement of the NP/ASIC 16 only. On the egress side, the NP/ASIC 16 has an additionally responsible of learning the new MAC when flooding/forwarding data frames.

Also, with the network processor-based learning, the NP/ASIC 16 will additionally be involved in MAC learning from the fabric side (in addition to the port side). Also, the ingress NP/ASIC 16 is responsible for extracting/transmitting the extra fields required by an egress NP/ASIC 16 to learn the MAC address. It is expected that the forwarding module 14 for the associated NP/ASIC 16 can still use an interrupt based messaging approach to retrieve newly learned MAC addresses on the same line card 10A, 10B. However, the forwarding module 14 does not send the MAC addresses to the Ethernet manager 12 thus reducing messaging between the forwarding module 14 and the Ethernet manager 12.

It is to be noted that with network processor-based learning there can be situation where Link Aggregation Group (LAG) member ports are spread across the line cards 10A, 10B (and other line cards). One of the line cards 10A, 10B performs the learning on LAG logical port (lport)/Stacked LAG lport and it will not be propagated to the other line cards 10A, 10B as the flow of traffic did not required to do so. With network processor-based learning, this can be issue which can be solved via in-band messaging between the NP/ASICs 16 to keep them updated with the MAC entries learnt on LAG interfaces. In order to optimize this approach, this in-band messaging is only enabled on a particular Virtual Local Area Network (VLAN) when some LAG based lport is included as a member therein.

The forwarding module 14 can be responsible for setting a LAG present bit in a VLAN table (VLAN_STR_NUM) in the NP/ASIC 16. The LAG present bit is set for any VLAN that has at least one LAG interface having LAG members spread across the line cards 10A, 10B. When the LAG present bit is set, the NP/ASIC 16 uses the LAG in-band messaging for synchronizing the MAC learnt for the VLAN. Also, the forwarding module 14 is configured to coordinate with the NP/ASIC 16 for forwarding/flooding of traffic to the egress side.

In conventional operation, the NP/ASIC 16 performs MAC learning at the ingress side only (i.e., packets received from front ports and Optical Transport Network (OTN) ports are inspected for new MAC addresses). When a new packet is received by the NP/ASIC 16, processing is performed based on the direction it came from. The NP/ASIC 16 can include circuitry and logic to send the packet to the appropriate place (ingress port, or fabric side). On the ingress side, the NP/ASIC 16 reads any VLAN tag value, the source and destination MAC addresses and forms a lookup key which is passed to functions in the NP/ASIC 16 for lookup and classification of the packet and for forwarding and Quality of Service decisions. The NP/ASIC 16 performs the MAC addresses lookup and passes the result to the logic for forwarding and Quality of Service decisions. Again in the logic for forwarding and Quality of Service decisions, the ingress path logic inspects the lookup results and the message it has received. A learning operation is performed if the source MAC address is unknown. In the network processor-based learning described herein, the NP/ASIC 16 is further configured to mimic the conventional operation on the ingress path in the "from fabric" path. That is, in order to achieve egress learning, some of the operations described earlier for the ingress path are ported/implemented for the "from fabric path".

In addition to having the NP/ASIC 16 responsible for learning MAC addresses (without involvement of a processor such as the Ethernet manager 12), the load balancing systems and methods include a synchronization strategy between different line cards 10A, 10B reducing overall throughput. First, the NP/ASICs 16 are configured to synchronize their MAC addresses via communication over data frames 20 therebetween. That is, the NP/ASICs 16 are configured to communicate newly learned MAC addresses to other NP/ASICs 16 via data frames 20 addressed thereto. The data frames 20 are also sent according to a hash-based time slot strategy where each flow on creation is assigned a time slot at which its entry will be updated on all the line cards 10A, 10B to effectively distribute the updating of MAC addresses over a period of time instead of confining it as a single one time event. FIG. 4, for example, illustrates a graph of throughput capacity showing the load balancing systems and methods. As noted by comparing FIG. 4 to FIG. 2 (i.e., conventional approaches), the load balancing systems and methods assure throughput capacity is not exceeding on the line cards 10A, 10B thereby preventing packet drops.

The hash-based time slot strategy is a constraint upon the NP/ASICs 16 determining when and what MAC addresses are synchronized. The objective of the hash-based time slot strategy is to distribute MAC address synchronization to avoid packet drops based thereon. In the hash-based time slot strategy, Ethernet flows are classified on the basis of a hash algorithm which computes a hash value on the basis of a tuple. The tuple includes MAC Source/Destination address, Internet Protocol (IP) Source/Destination address, protocol type, and Transmission Control Protocol (TCP) source port. On the basis of the hash value, learnt MAC addresses on one NP/ASIC 16 (e.g., the NP/ASIC 16 on the line card 10A) are synchronized other NP/ASICs 16 (e.g., the NP/ASIC 16 on the line card 10B). The following table gives an example of how various flows are assigned to different offsets of time depending upon the above mentioned parameters.

| FlowId | Arrival Time | Time Slot offset (in secs) |
| --- | --- | --- |
| Flow A | X | 0 |
| Flow B | X | +1 |
| Flow C | X | +5 |
| Flow D | X | +7 |

The hash-based time slot strategy of the load balancing systems and methods decreases the throughout load by distributing it over a period of time. As illustrated in FIG. 4, throughput load is now not a constant high but the time slot strategy has now distributed the load over a period of time.

The objective of the hash-based time slot strategy is to distribute MAC address synchronization over time as opposed to a single event every X secs. For example, assume each of the line cards 10A, 10B supports 128 k MAC addresses. In the conventional embodiments of FIGS. 1-2, the line cards 10A, 10B synchronizing 128 k MAC addresses approximately every 90 secs. In the hash-based time slot strategy, the objective is to break down the synchronization of the 128 k MAC addresses such as 2 k MAC addresses being synchronized every sec. The hash-based time slot strategy can include various hashing algorithms each of which is configured to slot newly learned MAC addresses into time slots for MAC address synchronization in a distributed manner. The foregoing descriptions include exemplary hashing algorithms.

In an exemplary embodiment, in the case of layer 2 packets, the parameters affecting the hashing algorithm for packets with newly learned MAC addresses include hardware logical port identification (HW_LportID), a first VLAN ID (if present), a second VLAN ID (if present), destination MAC address, and source MAC address. For the source and destination MAC addresses, these are 96 bits (i.e., 48 bits each for the source and destination MAC addresses) stored as three 32 bit variables, mac_addr1, mac_addr2, mac_addr3. The objective from the aforementioned parameters is to reduce these parameters to a smaller value (e.g., a 4 bit number) that can be used to slot the packets in a time slot for MAC address synchronization. This smaller value can be denoted as hash_result which is initially set to zero.

If a newly learned MAC address packet has two VLANs present, the hashing algorithm for finding the time slot for synchronization can include the following operations in order:
hash_result=XOR(vlan1, vlan2)//16 bit operation
hash_result=XOR(hash_result, HW_LportID)//16 bit operation
temp_variable=XOR(hash_result, mac_addr1)//32 bit xoring
temp_variable=XOR(hash_result, mac_addr2)//32 bit xoring
hash_result=XOR (temp_variable, mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower 8 bits of hash_result)//4 bit result
The hash_result is passed on to circuitry and logic in the NP/ASIC 16 and used to determine when this newly learned MAC address is synchronized with other NP/ASICs 16. Also, these operations can be performed in the NP/ASIC 16 or in other circuitry and logic.

If a newly learned MAC address packet has one VLAN present, the hashing algorithm for finding the time slot for synchronization can include the following operations in order:
hash_result=XOR(vlan_id1, HW_LportID)//16 bit operation
temp_variable=XOR(hash_result, mac_addr1)//32 bit xoring
temp_variable=XOR(hash_result, mac_addr2)//32 bit xoring
hash_result=XOR (temp_variable, mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result
The hash_result is passed on to circuitry and logic in the NP/ASIC 16 and used to determine when this newly learned MAC address is synchronized with other NP/ASICs 16. Also, these operations can be performed in the NP/ASIC 16 or in other circuitry and logic.

If a newly learned MAC address packet has no VLANs present, the hashing algorithm for finding the time slot for synchronization can include the following operations in order:
hash_result=XOR(hash_result, HW_LportID)//16 bit operation
temp_variable=XOR(hash_result, mac_addr1)//32 bit xoring
temp_variable=XOR(hash_result, mac_addr2)//32 bit xoring
hash_result=XOR (temp_variable, mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result
The hash_result is passed on to circuitry and logic in the NP/ASIC 16 and used to determine when this newly learned MAC address is synchronized with other NP/ASICs 16. Also, these operations can be performed in the NP/ASIC 16 or in other circuitry and logic. Thus, in the case of no VLANs, the hashing algorithm is based on the source and destination MAC addresses and the hardware logical port IDs. This hashing algorithm takes two 48 bit numbers, the source and destination MAC addresses, and one 16 bit number, the hardware logical port ID, and coverts it into a single 4 bit number used to slot the MAC address synchronization time slot.

In an exemplary operation, assume a new source MAC address of 00:10:94:00:00:02 is learned with a corresponding destination MAC address of 00:00:01:00:00:01. Further, assume no VLAN is present and the HW_LportID is 2104 (port 9)=0x838. The following illustrates an exemplary operation of the aforementioned exemplary hashing algorithm.

$$\text{hash\_result} = XOR(0, 0x0838) \text{ // 16 bit operation;}$$
$$\text{note hash\_result initially} = 0$$
$$= 0x0838$$

$$\text{temp\_variable} = XOR(0x0838, 0x00000100) \text{ // 32 bit xoring}$$
$$= 0x938$$

$$\text{temp\_variable} = XOR(0x938, 0x00010010) \text{ // 32 bit xoring}$$
$$= 0x10928$$

$$\text{hash\_result} = XOR(0x10928, 0x94000002) \text{ // 32 bit xoring}$$
$$= 0x940192A$$

$$\text{hash\_result} = XOR(0x9401, 0x092A) \text{ // 16 bit}$$
$$= 0x9D2B$$

$$\text{hash\_result} = XOR(0x9D, 0x2B) \text{ // 8 bit}$$
$$= B6$$

$$\text{hash\_result} = XOR(0XB, 0x6) \text{ // 4 bit result}$$
$$= D \text{ // passed on to circuitry and logic}$$

XOR is an exclusive OR logical operation which can be implemented in the NP/ASIC 16, in circuitry and logic, in software, or in a combination thereof.

In an exemplary embodiment, in the case of bridging, the parameters affecting the hashing algorithm for packets with newly learned MAC addresses include a first VLAN ID (if present), a second VLAN ID (if present), a destination MAC address, a source MAC address, a destination Internet Protocol (IP) (DIP) address, a source IP (SIP) address, and whether or not the IP protocol is being used. For the source and destination MAC addresses, these are 96 bits (i.e., 48 bits each for the source and destination MAC addresses) stored as three 32 bit variables, mac_addr1, mac_addr2, mac_addr3. The objective from the aforementioned parameters is to reduce these parameters to a smaller value (e.g., a 4 bit number) that can be used to slot the packets in a time slot for MAC address synchronization. This smaller value can be denoted as hash_result which is initially set to zero.

The hashing algorithm, in the case of bridging, the hashing algorithm for finding the time slot for synchronization can include the following operations in order:
hash_result=XOR(vlan1, vlan2)//if VLANs are present
hash_result=XOR(hash_result, IPprotocol)//8 bit operation if IP packet present
temp=XOR(hash_result, DIP)//32 bit operation if IP packet present
hash_result=XOR(hash_result, SIP)//32 bit operation if IP packet present
temp_variable=XOR(hash_result,mac_addr1)//32 bit xoring
temp_variable=XOR(hash_result,mac_addr2)//32 bit xoring
hash_result=XOR (temp_variable,mac_addr3)//32 bit xoring
hash_result=XOR(upper 16 bits of hash_result,lower 16 bits of hash_result)//16 bit
hash_result=XOR(upper_8 bit of hash_result, lower_8 bits of hash_result)//8 bit
hash_result=XOR(upper_4 bit of hash_result,lower_8 bits of hash_result)//4 bit result
The hash_result is passed on to circuitry and logic in the NP/ASIC 16 and used to determine when this newly learned MAC address is synchronized with other NP/ASICs 16. Also, these operations can be performed in the NP/ASIC 16 or in other circuitry and logic.

With the load balancing systems and methods, the Ethernet manager 12 and the associated CPU as well as the forwarding module 14 are freed from the distribution of MAC entries across line cards 10A, 10B. However, the Ethernet manager 12 still needs to keep track of MAC entries to handle the User Interface requests. The Ethernet manager 12 and the associated CPU need to handle a MAC fetch from the NP/ASIC 16. Two exemplary approaches include a user triggered approach and an asynchronous read approach. In the asynchronous read approach, asynchronous reads of MAC addresses are performed from the NP/ASIC 16. Here, the forwarding module 14 keeps its local database updated all of the time. This approach requires ongoing operations to continually synchronize the MAC addresses from the NP/ASIC 16 to the forwarding module 14.

In the user triggered approach, there is no collection of MAC addresses that are done in the normal course of operation of the Ethernet manager 12. Only when a user wants the information of MAC addresses is there a fetch operation from the NP/ASIC 16. Parameters are received by the user (e.g., either via Command Line Interface (CLI), Hypertext Transfer Protocol (HTTP) or Simple Network Management Protocol (SNMP)). The forwarding module 14 is configured to receive this request for a current snapshot of the MAC address table in the NP/ASIC 16. Once the forwarding module 14 obtains the current snapshot, it is provided to the Ethernet manager 12 as well as stored in a local database of the forwarding module 14 (i.e., replacing any previous snapshots). This local database of the forwarding module 14 can be solely used for providing MAC addresses to users, and not for forwarding decisions. For example, upon detection of topology changes, the forwarding module can be only responsible for ensuring learnt MAC entries are removed from the NP/ASIC 16 and not from its own local database. This approach has the benefit in itself that it relieves the Ethernet manager 12 and the associated CPU for other important tasks. Further, this approach only requires operations when the user wants to view the current snapshot.

Figure 5:
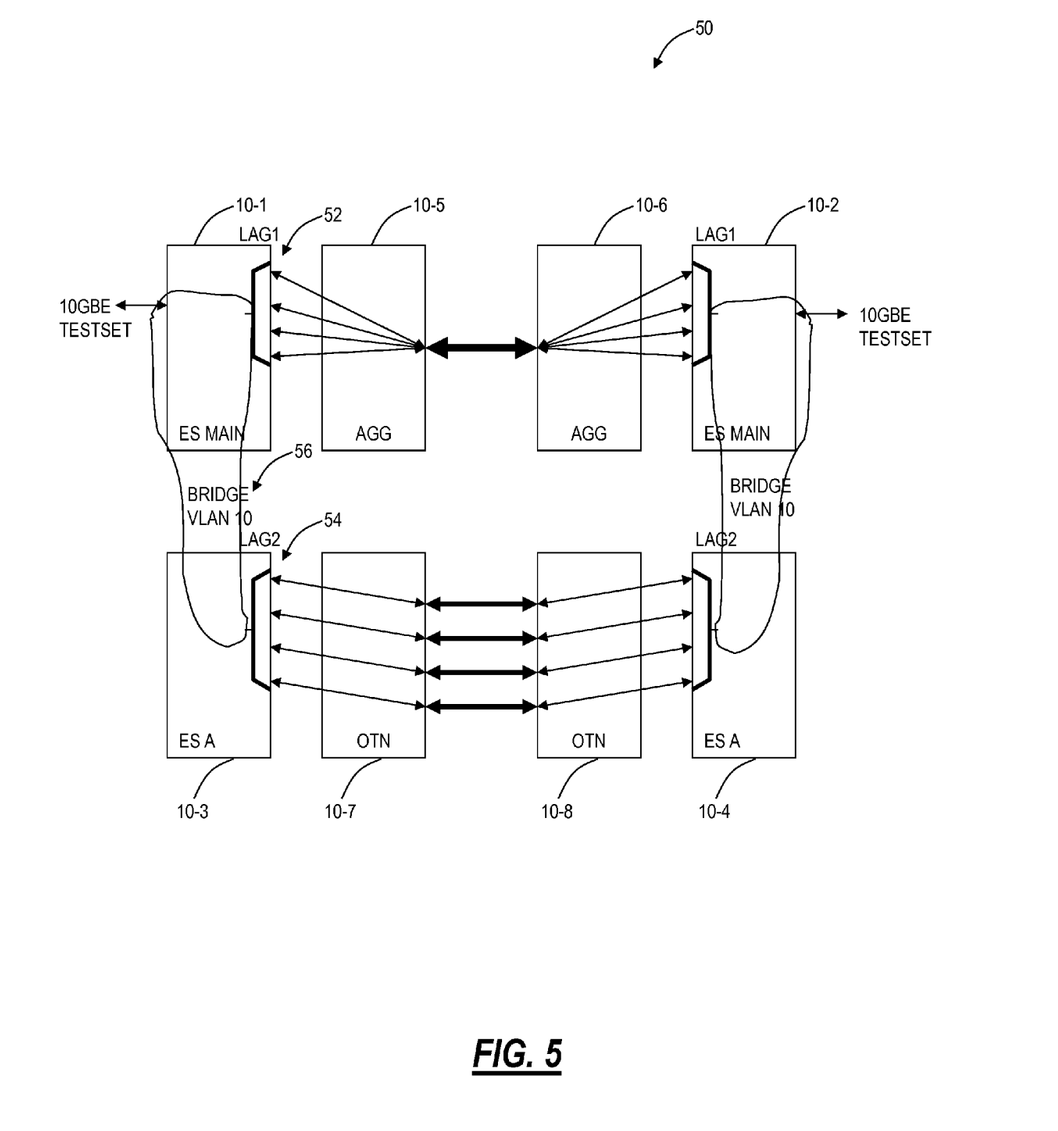
FIG. 5 is a block diagram of an exemplary operation of the load balancing systems and methods across plural line cards in an exemplary system.

Referring to FIG. 5, in an exemplary embodiment, a block diagram illustrates an exemplary operation of the load balancing systems and methods across plural line cards 10 in a system 50. The system 50 can be a node (also known as a network element) with a multi-slot architecture. In the example of FIG. 5, the system 50 includes eight line cards 10-1-10-8 for illustration purposes. The system 50 includes four Ethernet switching (ES) line cards 10-1-10-4. In this example, the line cards 10-1, 10-2 are designed as masters and the line cards 10-3, 10-4 are designated as non-masters. The system 50 further includes four transport line cards (AGG, OTN) 10-5-10-8. The transport line cards 10-5-10-8 are meant to optical connect the ES line cards 10-1-10-4 over a distance, for example. The ES line card 10-1 is connected to the ES line card 10-2 via the aggregator (AGG) line cards 10-5, 10-6. The AGG line cards 10-5, 10-6 can provide multiplexing, such as four GbE signals into a larger signal. This multiplexing can include OTN multiplexing using ODUflex connections.

The ES line cards 10-3, 10-4 are connected via OTN transponder line cards 10-7, 10-8 that can transport GbE signals, for example, over OTN connections. The load balancing systems and methods are performed between the line cards 10-1, 10-3 and between the line cards 10-2, 10-4. For example, a LAG group 52 is set up between the line cards 10-1, 10-2 and a LAG group 54 is set up between the line cards 10-3, 10-4, each of the LAG groups 52, 54 being four lines. Further, the system 50 includes a VLAN bridge 56 between the LAG groups 52, 54. In the context of the foregoing, the line cards 10-1, 10-3 and the line cards 10-2, 10-4 can coordinate with one another using the load balancing systems and methods described herein.

Figure 6:
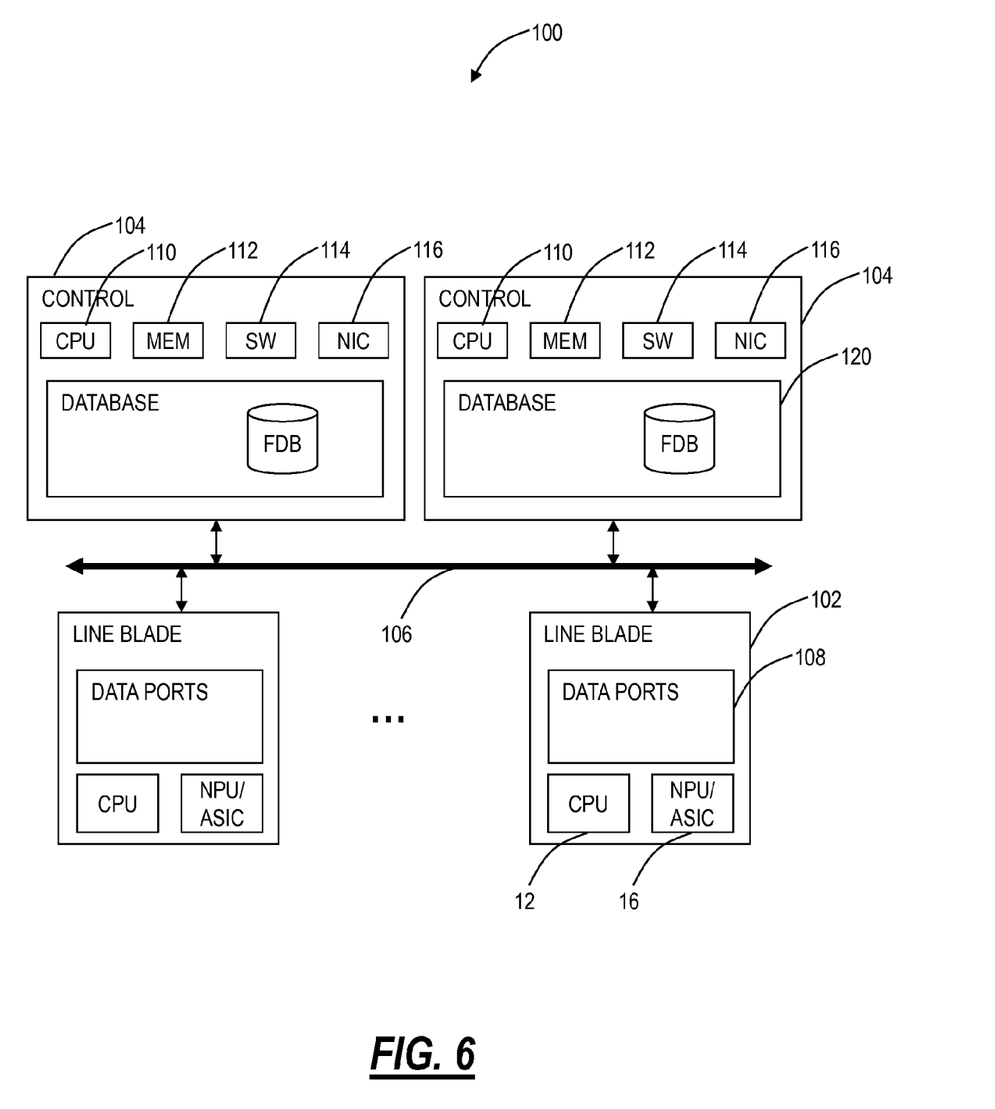
FIG. 6 is a block diagram of an exemplary implementation of a node for the load balancing systems and methods.

Referring to FIG. 6, in an exemplary embodiment, a block diagram illustrates an exemplary implementation of the node 100. In this exemplary embodiment, the node 100 is an Ethernet network switch, but those of ordinary skill in the art will recognize the load balancing systems and methods, contemplate other types of network elements and other implementations. In this exemplary embodiment, the node 100 includes a plurality of blades 102, 104 interconnected via an interface 106. The blades 102, 104 are also known as line cards, line modules, circuit packs, pluggable modules, etc. and refer generally to components mounted within a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two exemplary blades are illustrated with line blades 102 and control blades 104. The line blades 102 generally include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the backplane 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 12. "Switching fabric" includes switching units, or individual boxes, in a node; integrated circuits contained in the switching units; and programming that allows switching paths to be controlled. Note, the switching fabric can be distributed on the blades 102, 104, in a separate blade (not shown), or a combination thereof. The line blades 102 can include the Ethernet manager 12 (i.e., a CPU) and the NP/ASIC 16. As described herein, the line blades 102 can participate in MAC address learning using the NP/ASIC 16 and synchronizing learnt MAC addresses therebetween using the hashing algorithms described herein.

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a forwarding database (FDB) that may be populated as described herein (e.g., via the user triggered approach or the asynchronous approach). In this exemplary embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 7:
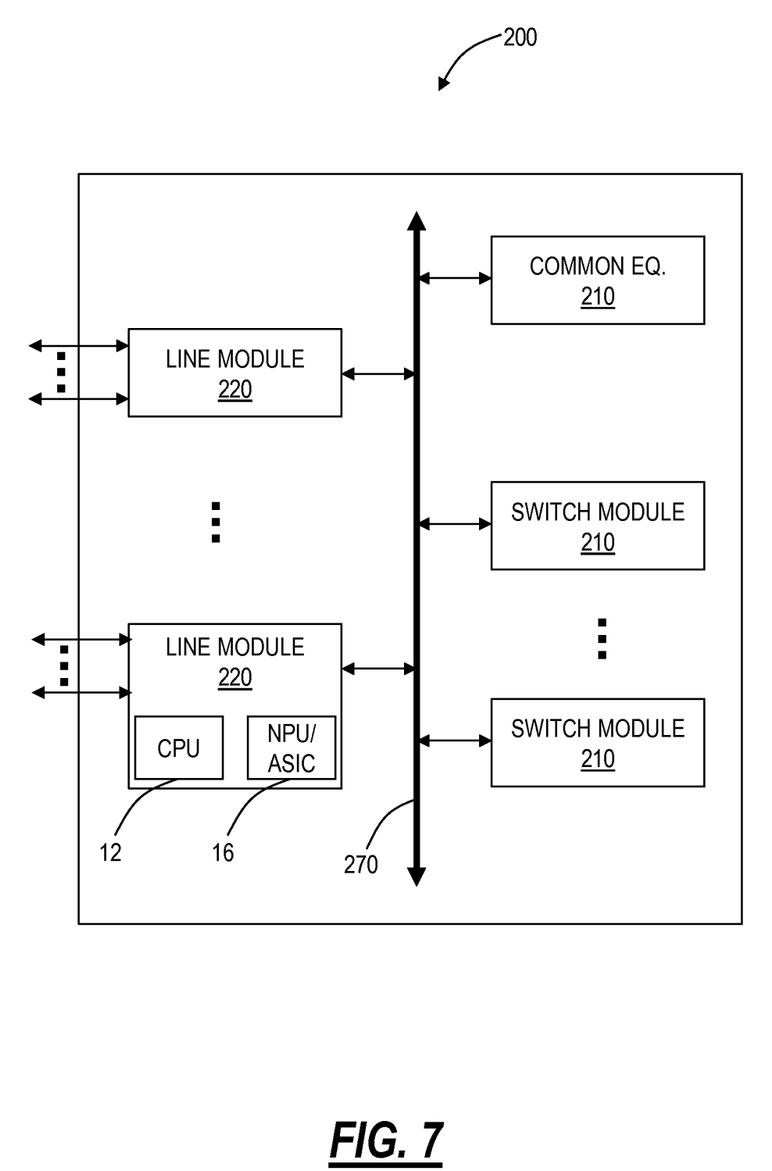
FIG. 7 is a block diagram of another exemplary implementation of a node for the load balancing systems and methods.

Referring to FIG. 7, in an exemplary embodiment, a block diagram illustrates another exemplary implementation of a node 200. For example, the node 100 can be a dedicated Ethernet switch whereas the node 200 can be a multiservice platform. In an exemplary embodiment, the node 200 can be a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the node 200 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching therebetween of channels, timeslots, tributary units, wavelengths, etc. While the node 200 is generally shown as an optical network element, the load balancing systems and methods are contemplated for use with any switching fabric, network element, or network based thereon.

In an exemplary embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 therebetween. For example, the interface 3270 can be a backplane, mid-plane, a bus, optical or electrical connectors, or the like. The line modules 220 are configured to provide ingress and egress to the switch modules 230 and external to the node 200. In an exemplary embodiment, the line modules 220 can form ingress and egress switches with the switch modules 230 as center stage switches for a three-stage switch, e.g., a three stage Clos switch. The line modules 220 can include optical or electrical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc.

Further, the line modules 220 can include a plurality of connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 220 can include wavelength division multiplexing interfaces, short reach interfaces, and the like, and can connect to other line modules 220 on remote network elements, end clients, edge routers, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), etc.; Ethernet granularity; Digital Signal n (DSn) granularity such as DS0, DS1, DS3, etc.; and the like. Specifically, the switch modules 330 can include both Time Division Multiplexed (TDM) (i.e., circuit switching) and packet switching engines. The switch modules 330 can include redundancy as well, such as 1:1, 1:N, etc.

Those of ordinary skill in the art will recognize the nodes 100, 200 can include other components which are omitted for illustration purposes, and that the systems and methods described herein are contemplated for use with a plurality of different nodes with the nodes 100, 200 presented as an exemplary type of node. For example, in another exemplary embodiment, a node may not include the switch modules 230, but rather have the corresponding functionality in the line modules 220 (or some equivalent) in a distributed fashion. For the nodes 100, 200, other architectures providing ingress, egress, and switching therebetween are also contemplated for the systems and methods described herein. In general, the systems and methods described herein contemplate use with any node providing switching or forwarding of channels, timeslots, tributary units, wavelengths, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Ethernet system, comprising:
a first line card comprising at least one port configured to receive Ethernet data packets and a first data path device; and
a second line card comprising at least one port configured to receive Ethernet data packets and a second data path device, wherein the second line card is communicatively coupled to the first line card;
wherein the first data path device is configured to synchronize learned Media Access Control (MAC) addresses with the second data path device by exchange of data packets according to a hash-based time slot approach, wherein the hash-based time slot approach slots MAC address updates for newly learned MAC addresses over time in a distributed manner, wherein the hash-based timed slot approach breaks up the newly learned MAC addresses into at least two groups of learned MAC addresses, and wherein each group is provided a different time offset such that each group is slotted for MAC address synchronization based on the provided time offset.

2. The Ethernet system of claim 1, wherein the first data path device is configured to learn MAC addresses received from a port side and from a fabric side associated with the first line card.

3. The Ethernet system of claim 1, wherein the hash-based time slot approach is configured to distribute the data packets of learned MAC addresses over time to prevent adverse effects on packet traffic.

4. The Ethernet system of claim 1, wherein the hash-based time slot approach is configured to slot newly learned MAC addresses into time slots for an associated data packet to be sent to the second data path device.

5. The Ethernet system of claim 1, wherein the hash-based time slot approach utilizes a plurality of parameters to assign a newly learned MAC address to a time slot for synchronization.

6. The Ethernet system of claim 5, wherein the plurality of parameters comprise any of hardware logical port identification, virtual local area network identification, destination MAC address, and source MAC address.

7. The Ethernet system of claim 6, wherein the hash-based time slot comprises a plurality of XOR operations on the plurality of parameters to derive a time slot.

8. The Ethernet system of claim 1, wherein the first data path device, upon learning a new MAC address associated with a link aggregation group, is configured to in-band message the second data path device the new MAC address.

9. The Ethernet system of claim 1, further comprising:
a first general processor on the first line card; and
a second general processor on the second line card;
wherein the first general processor and the second general processor do not participate in the learning MAC addresses.

10. The Ethernet system of claim 9, wherein the first general processor is configured to fetch MAC addresses from the first data path device responsive to a user request.

11. A data path device, comprising:
logic circuitry configured to learn Media Access Control (MAC) addresses both from a port side and a fabric side; and
logic circuitry configured to synchronize learned MAC addresses with at least one additional data path device disposed on a separate line card;
wherein the synchronized learned MAC addresses are sent to the at least one additional data path device via data packets according to a hash-based time slot approach, wherein the hash-based time slot approach slots MAC address updates for the learned MAC addresses over time in a distributed manner, wherein the hash-based timed slot approach breaks up the newly learned MAC addresses into at least two groups of learned MAC addresses, and wherein each group is provided a different time offset such that each group is slotted for MAC address synchronization based on the provided time offset.

12. The data path device of claim 11, wherein the hash-based time slot approach is configured to distribute the data packets of learned MAC addresses over time to prevent adverse effects on packet traffic.

13. The data path device of claim 11, wherein the hash-based time slot approach is configured to slot newly learned MAC addresses into time slots for an associated data packet to be sent to the at least one additional data path device.

14. The data path device of claim 11, wherein the hash-based time slot approach utilizes a plurality of parameters to assign a newly learned MAC address to a time slot for synchronization.

15. The data path device of claim 14, wherein the plurality of parameters comprise any of hardware logical port identification, virtual local area network identification, destination MAC address, and source MAC address.

16. The data path device of claim 15, wherein the hash-based time slot comprises a plurality of XOR operations on the plurality of parameters to derive a time slot.

17. The data path device of claim 11, wherein the logic circuitry configured to synchronize learned MAC addresses, upon learning a new MAC address associated with a link aggregation group, is configured to in-band message the at least one additional data path device the new MAC address.

18. A method, comprising:
utilizing a first data path device on a first line card to learn Media Access Control (MAC) addresses;
synchronizing newly learned MAC addresses with at least one additional data path device on a separate line card from the first line card, wherein the synchronizing comprises exchanging a data packet according to hash-based time slot approach, wherein the hash-based time slot approach slots MAC address updates for the newly learned MAC addresses over time in a distributed manner, wherein the hash-based timed slot approach breaks up the newly learned MAC addresses into at least two groups of learned MAC addresses, and wherein each group is provided a different time offset such that each group is slotted for MAC address synchronization based on the provided time offset; and
operating a generalized processor on the first line card without the generalized processor being involved in the synchronizing newly learned MAC addresses.

19. The method of claim 18, further comprising:
performing a plurality of XOR operations on a plurality of parameters associated with a packet having a newly learned MAC address to determine a time slot for the data packet.

20. The method of claim 18, further comprising:
determining a newly learned MAC address is involved in a link aggregation group (LAG) associated with the separate line card; and
in-band messaging the at least one additional data path device with the newly learned MAC address.

\* \* \* \* \*